United States Patent [19]

Lilienthal

[11] Patent Number: 4,836,935

[45] Date of Patent: Jun. 6, 1989

[54] OIL REMOVAL FROM WATERFLOODING INJECTION WATER

[75] Inventor: Walter B. Lilienthal, Houston, Tex.

[73] Assignee: Conoco Inc., Ponca City, Okla.

[21] Appl. No.: 242,944

[22] Filed: Sep. 9, 1988

[51] Int. Cl.$^4$ ............................................. B01D 17/038
[52] U.S. Cl. ..................................... 210/788; 209/144; 209/211; 210/512.1
[58] Field of Search ............... 210/787, 788, 634, 925, 210/512.1; 166/267; 209/144, 211; 55/193

[56] References Cited

U.S. PATENT DOCUMENTS 3,898,061  8/1975  Brunato .................................. 55/193

Primary Examiner—Frank Sever
Attorney, Agent, or Firm—Richard W. Collins

[57] ABSTRACT

Produced oil and water from a waterflood operation are initially subjected to a rough separation step producing an oil stream and an oily water stream. The oily water stream is mixed with a high density solvent for the oil, and the resulting mixture is processed in a hydrocyclone to produce clean water and an oil-solvent stream. The clean water is reinjected as additional flooding water, and the oil-solvent stream is separated to produce an oil product and clean solvent which is recycled to the process.

5 Claims, 1 Drawing Sheet

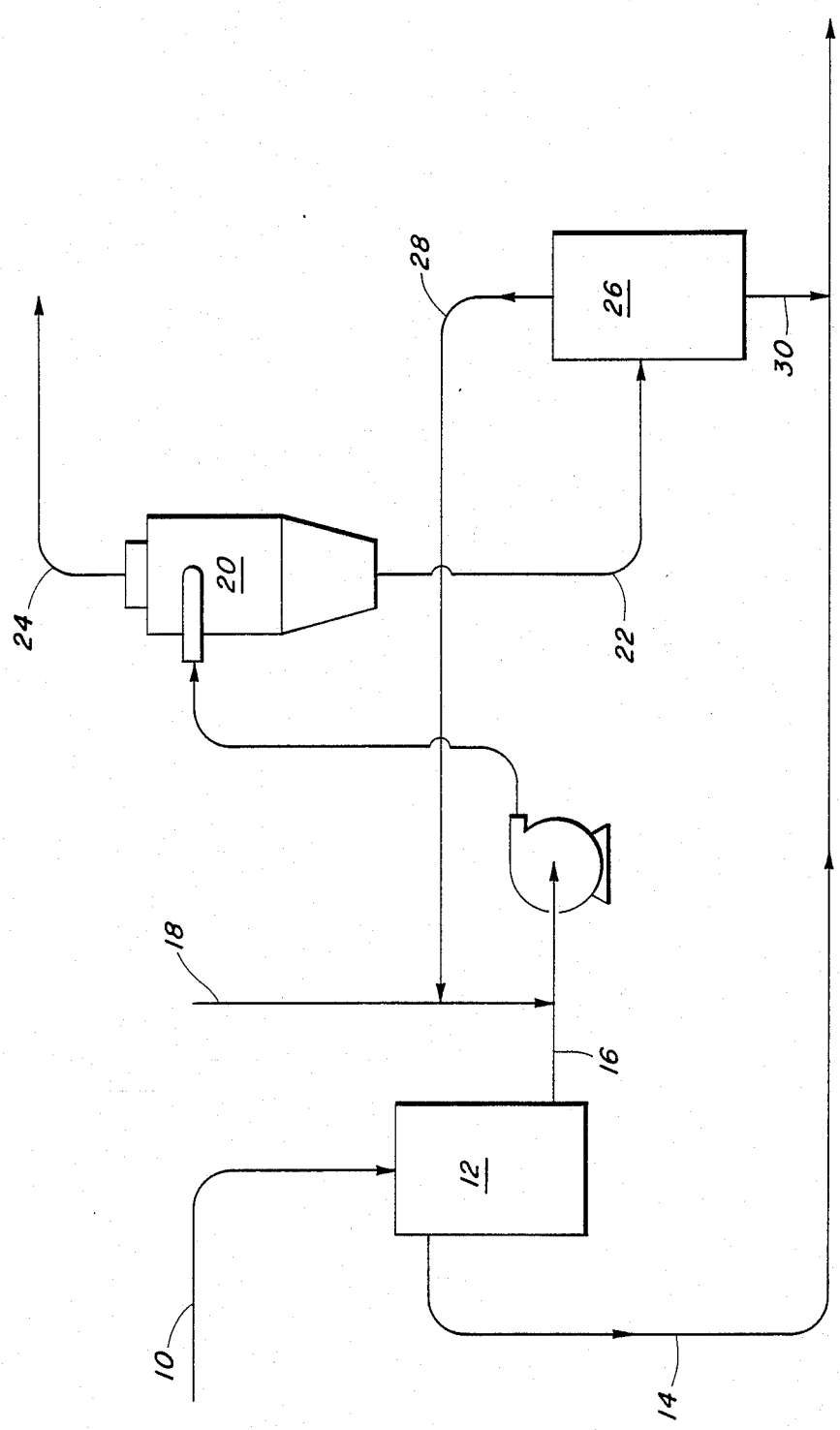

OIL REMOVAL FROM WATERFLOODING INJECTION WATER

BACKGROUND OF THE INVENTION

In a waterflood project for recovery of additional oil after completion of primary production, water is injected through at least one injection well extending into an oil-bearing formation to displace formation fluids, including oil, and to produce additional oil from at least one producing well extending into the flooded formation. The displaced fluids recovered through the production well include a mixture of oil and water. This mixture is typically separated into an oil stream and a water stream by conventional means such as settling, coalescing, or the like. Most commonly, the separation is carried out in a heater-treater of the type widely used in oil production operations.

In a waterflood operation, the separated oil is recovered, and the separated water, which invariably contains a small but significant amount of oil even after the separation step, is reinjected into the formation as additional flooding water.

The presence of this small amount of oil in the separated water stream (oily water) is detrimental in several respects. The oil in the oily water, if not separated, is lost from the recovered oil total. Even though the concentration of oil in the oily water is low, the volume of water is high, such that the amount of lost oil recovery over a period of time is significant. Additionally, the presence of oil in the injection water leads to injection inefficiencies. Even small amounts of oil in injection water can substantially reduce the water injectivity at a given level of pumping capacity, largely due to permeability effects on the formation adjacent the injection well.

It is technically feasible to reduce the amount of oil in the oily water stream to acceptable levels using conventional techniques, but the equipment needed to accomplish this by, for example, use of heater treaters and separation tanks, is too large and heavy to be acceptable for offshore operations where platform weight and space are limiting factors.

One recent proposal for overcoming the problem relies on use of hydrocyclones on the production platform to provide a high degree of separation of the oil and water. This approach has met with considerable success, since the weight and space requirements for the hydrocyclones are much less than for conventional separators. However, the system has limitations in that some oily water streams are difficult to separate in hydrocyclones because of surface tension or density considerations. For example, the density of some produced oils is close enough to that of water to limit the efficiency of the hydrocyclone.

Thus, there is a continuing need for more efficient methods of recovering oil from oily water (defined herein as water or brine containing less than 2 percent oil by volume). The present invention provides such a method.

SUMMARY OF THE INVENTION

According to the present invention, produced oil and water from a waterflood operation are first separated in a rough separation step to produce an oil stream and an oily water stream (less than 2 volume solvent for the oil, and the mixture is passed to a hydrocyclone where a substantially oil-free water steam and an oil-solvent stream are produced. The oil-solvent stream is separated into produced oil and recycled solvent, and the water stream is reinjected as additional flooding water.

THE DRAWINGS

The FIGURE is a schematic diagram illusrating the process of the invention.

DESCRIPTION OF THE PREFERRED EMBODIMENTS

The preferred embodiments of the invention will be described with reference to the drawing. A production stream comprising oil and water is conducted via line 10 to separator 12 where an oil stream 14 and an oily water stream 16 are produced. The oily water stream, containing less than 2 percent by volume oil, and preferably less than 1 percent, is mixed with a heavy solvent for oil from line 18 and pumped to hydrocyclone 20 from which an oil-solvent stream is recovered via line 22. A substantially oil-free water stream is recovered from hydrocyclone 20 via line 24.

The oil-solvent stream from line 22 is passed to solvent recovery unit 26, which preferably is a distillation unit. Separated solvent from recovery unit 26 is combined via line 28 with fresh solvent in line 18 and recycled to additional oily water. Oil from recovery unit 26 is recovered via line 30, preferably combined with oil from line 14 and conveyed to a pipeline (not shown) or otherwise transferred to a processing facility.

THE SOLVENTS

The solvents for the process are those materials which are good solvents for the oil, which are immiscible with water or brine, and which have a specific gravity sufficiently higher than that of water or brine to provide efficient separation in the hydrocyclone. A specific gravity of 1.2 is a minimum for efficient operation, and the most preferred solvents are those with a specific gravity of about 1.6.

Examples of suitable solvents are the various commercially available halogenated alkanes, such as 1,1,2-trichloro -1,2,2-trifluoroethane, which has the required solubility properties and has a specific gravity of about 1.6. Carbon tetrachloride also has good solubility properties and a specific gravity of about 1.6. Any other solvent having the requisite solubility and specific gravity properties could be used. Non-flammable, non-toxic, environmentally acceptable materials with the required solubility and specific gravity properties are most preferred. The solvents should have a volatility such that separation from extracted oil can be readily accomplished.

OPERATION OF THE PROCESS

The preferred embodiment of the invention involves subjecting a produced oil and water stream to a rough separation step in a heater-treater to produce an oil stream and an oily water stream containing less than 2 volume percent oil. The oily water stream is mixed with 1,1,2-trichloro -1,2,2-trifluoroethane in an amount equal to from 0.5 to 10 or more times the volume of oil in the oily water stream. The oily water-solvent stream is conducted to a hydrocyclone where oil and solvent are recovered in one stream and oil-free water in another. The combination of the large specific gravity difference in the two streams and the selective miscibility of the solvent enables oil removal from the oily water stream to be accomplished more efficiently than when making the oil-water separation by hydrocyclones without the addition of the solvent.

The oil-solvent stream from the hydrocyclone is separated, preferably using process heat from the heater-treater, to provide product oil and recycle solvent.

The benefits of the process are most pronounced when it is used on an offshore platform where weight and space considerations are most critical, although the process is not limited to use on offshore platforms.

I claim:

1. In a process of recovering crude oil from a subterranean formation by injecting flooding water into an injection well extending into said formation and recovering produced oil and water from at least one production well extending into said formation, and wherein said produced oil and water are separated and said water is reinjected through said injection well as flooding water, the improvement wherein:
 (a) said produced oil and water is initially subjected to a rough separation step providing a produced oil stream and an oily water stream;
 (b) mixing said oily water stream with a solvent for crude oil which is substantially insoluble in water and which has a specific gravity of at least 1.2;
 (c) passing said oily water and solvent to a hydrocyclone;
 (d) recovering substantially oil-free water from a first outlet of said hydrocyclone;
 (e) recovering said solvent containing crude oil from said oily water from a second outlet of said hydrocyclone;
 (f) separating said solvent from its contained crude oil;
 (g) returning said recovered solvent to step (b); and
 (h) reinjecting said oil-free water from step (d) as additional flooding water.

2. The process of claim 1 wherein said solvent is a halogenated alkane having a specific gravity of about 1.6.

3. The process of claim 2 wherein said solvent is 1,1,2-trichloro-1,2,2-trifluoroethane.

4. The process of claim 2 wherein said wells are offshore wells and said separation steps are carried out on an offshore platform.

5. The process of claim 4 wherein said oily water stream from said rough separation step contains less than 2 percent by volume of oil.

* * * * *

UNITED STATES PATENT AND TRADEMARK OFFICE
CERTIFICATE OF CORRECTION

PATENT NO.  : 4,836,935
DATED       : June 6, 1989
INVENTOR(S) : Walter B. Lilienthal It is certified that error appears in the above-identified patent and that said Letters Patent is hereby corrected as shown below:

Column 1, line 66 - between "volume" and "solvent" insert --percent oil).
    The oily water stream is then contacted with a heavy--.

Column 1, line 68 - delete "steam" and insert --stream--.

Signed and Sealed this

Seventeenth Day of October, 1989

Attest:

DONALD J. QUIGG

Attesting Officer

Commissioner of Patents and Trademarks